(12) United States Patent
Pevnyi et al.

(10) Patent No.: US 11,378,477 B2
(45) Date of Patent: Jul. 5, 2022

(54) APPARATUS FOR MEASURING SURFACE PROFILE OF NORMAL AND SHEAR STRESS

(71) Applicant: Kent State University, Kent, OH (US)

(72) Inventors: Mykhailo Pevnyi, Chicago, IL (US); Tianyi Guo, Kent, OH (US); Fred Minkowski, Kent, OH (US); Vincent Hetherington, Independence, OH (US); Hiroshi Yokoyama, Hudson, OH (US); Peter Palffy-Muhoray, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 77 days.

(21) Appl. No.: 16/650,021

(22) PCT Filed: Sep. 25, 2018

(86) PCT No.: PCT/US2018/052544
§ 371 (c)(1),
(2) Date: Mar. 24, 2020

(87) PCT Pub. No.: WO2019/060870
PCT Pub. Date: Mar. 28, 2019

(65) Prior Publication Data
US 2020/0278283 A1  Sep. 3, 2020

Related U.S. Application Data

(60) Provisional application No. 62/562,538, filed on Sep. 25, 2017.

(51) Int. Cl.
| | |
|---|---|
| *G01L 5/00* | (2006.01) |
| *G01L 5/1623* | (2020.01) |
| *A43B 17/04* | (2006.01) |
| *G01L 1/20* | (2006.01) |
| *G01N 3/24* | (2006.01) |
| *A43B 3/34* | (2022.01) |

(52) U.S. Cl.
CPC .............. *G01L 5/1623* (2020.01); *A43B 3/34* (2022.01); *A43B 17/04* (2013.01); *G01L 1/205* (2013.01); *G01N 3/24* (2013.01)

(58) Field of Classification Search
CPC ..... G01L 5/1623; G01L 1/205; A43B 3/0005; A43B 17/04; G01N 3/24
See application file for complete search history.

(56) References Cited

U.S. PATENT DOCUMENTS

| | | | |
|---|---|---|---|
| 5,209,126 A | 5/1993 | Grahn | |
| 5,553,500 A * | 9/1996 | Grahn | ................... G01B 17/04 73/628 |
| 5,571,973 A * | 11/1996 | Taylot | .................. A61B 5/6892 73/862.046 |
| 6,216,545 B1 | 4/2001 | Taylor | |
| 6,520,834 B1 * | 2/2003 | Marshall | ................ B24B 37/04 451/10 |

(Continued)

*Primary Examiner* — Max H Noori
(74) *Attorney, Agent, or Firm* — Fay Sharpe LLP (57) ABSTRACT

An apparatus for measuring normal and shear stress at a surface. The apparatus includes a substrate; and a plurality of sensing units on the substrate. Each sensing unit includes a mechanical transducer having a receiving surface and a sensing surface; and a plurality of normal force sensors between the sensing surface and the substrate.

20 Claims, 5 Drawing Sheets

(56) References Cited

U.S. PATENT DOCUMENTS

| | | | |
|---|---|---|---|
| 2001/0015720 A1* | 8/2001 | Inukai | G06F 3/0338 |
| | | | 345/161 |
| 2005/0241409 A1* | 11/2005 | Taylor | A61B 5/447 |
| | | | 73/841 |
| 2011/0005325 A1* | 1/2011 | Yang | H01G 5/16 |
| | | | 73/724 |
| 2011/0203390 A1 | 8/2011 | Tao et al. | |
| 2012/0291563 A1 | 11/2012 | Schrock et al. | |
| 2013/0036829 A1* | 2/2013 | Van Steenberge | G01B 11/165 |
| | | | 73/800 |
| 2014/0214209 A1* | 7/2014 | Sugiura | B25J 9/1612 |
| | | | 310/322 |

\* cited by examiner

APPARATUS FOR MEASURING SURFACE PROFILE OF NORMAL AND SHEAR STRESS

This application is a National Stage Entry of International Application No. PCT/US2018/052544, filed Sep. 25, 2018, which claims the priority benefit of U.S. Provisional Application Ser. No. 62/562,538, filed Sep. 25, 2017, the contents of which are incorporated by reference herein.

BACKGROUND

The present disclosure relates to an apparatus for measuring a surface profile of normal and shear stress.

Precise measurement of stress at contact surfaces is of interest for both medical and mechanical applications. In some cases, knowledge of the spatial profile of shear stress across an entire contact surface is crucial. A relatively wide range of tools for measuring normal pressure is commercially available. At the same time, the number of tools for measurement of the spatial profile of shear stress across a surface is very limited.

It would be desirable to develop new systems and methods for measuring shear stress across a surface.

BRIEF DESCRIPTION

Disclosed, in some embodiments, is an apparatus for measuring a surface profile of normal and shear stress. The apparatus includes a substrate; and a plurality of sensing units on the substrate. Each sensing unit includes a mechanical transducer having a receiving surface and a sensing surface; and a plurality of normal force sensors between the sensing surface and the substrate.

In some embodiments, the mechanical transducer is a rectangular prism (e.g., a cube).

The plurality of normal force sensors may include four normal force sensors.

In some embodiments, the mechanical transducer includes a plurality of rigid inclusions dispersed in a flexible matrix.

Each normal force sensor may include a pressure sensitive film, a first electrode, and a second electrode.

In some embodiments, two electrodes are on opposite sides of the pressure sensitive film. In other embodiments, the two electrodes are on the same side of the pressure sensitive film.

The pressure sensitive film may include conductive particles dispersed in a polymer matrix.

In some embodiments, the conductive particles comprise carbon particles and/or metallic particles.

The pressure sensitive film may have has a thickness in the range of about 0.1 mm to about 1.5 mm.

In some embodiments, the first electrode and the second electrode comprise aluminum or copper.

The first electrode and the second electrode may have thicknesses in the range of about 0.02 mm to about 0.06 mm.

In some embodiments, each normal force sensor further comprises a second pressure sensitive film. The plurality of films may form a laminate. In some embodiments, the laminate includes a plurality of different layers of different materials.

The mechanical transducer may include a rigid vertical core in a central region.

Disclosed, in other embodiments, is an apparatus for measuring a surface profile of shear stress including a substrate; and a sensing unit which includes: a mechanical transducer having a receiving surface and a sensing surface; and a plurality of normal force sensors between the sensing surface and the substrate.

The mechanical transducer may include a plurality of rigid inclusions in a flexible matrix.

In some embodiments, normal force sensor includes a pressure sensitive film, a first electrode, and a second electrode.

Each normal force sensor may have a dynamic range of $10^4$ Pa to $10^6$ Pa.

Disclosed, in further embodiments, is a step-on platform or an in-shoe insert including the apparatus.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s),"

"include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to an apparatus for measuring shear stress across a surface.

Figure 1:
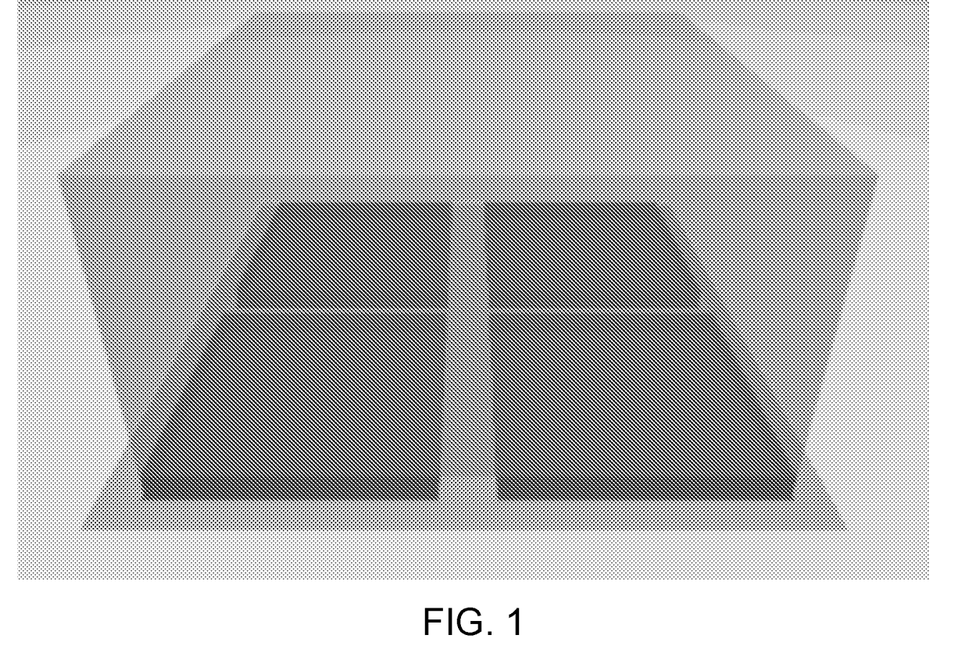
FIG. 1 is schematic illustration of a device for measuring of plantar shear forces using an array of sensing units. The construction is intended for indirect measurement of the force applied to the top face of each cube.

FIG. 1 illustrates a non-limiting embodiment of an apparatus. The apparatus 100 includes a substrate (bottom) and a sensing unit including a mechanical transducer (top) and a plurality of normal force sensors between the substrate and the mechanical transducer. An apparatus including the mechanical transducer and plurality of normal force sensors without the bottom substrate is also disclosed. In addition or as an alternative to the bottom substrate, a top substrate may be included above the mechanical transducer.

Figure 2:
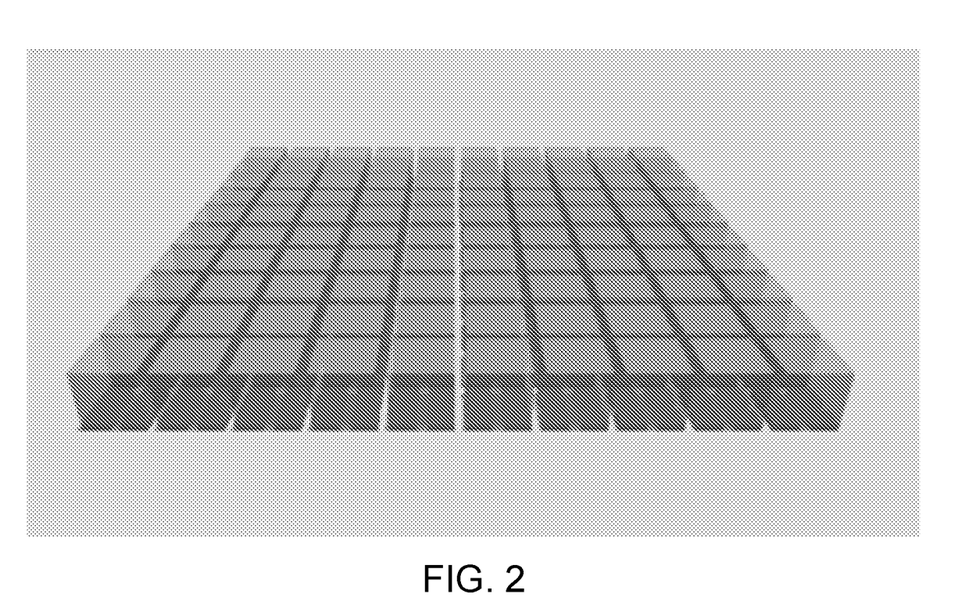
FIG. 2 is a schematic visualization of an individual shear/normal force sensing unit: four normal force sensors are shown in dark gray, with a hard cube (transparent gray) resting on top.

FIG. 2 illustrates an apparatus with 10×10 array of sensing units. The sensing units may share a common top and/or bottom substrate. Alternatively, a plurality of top and/or bottom substrates may be included. In some embodiments, each sensing unit is associated with its own individual top and/or bottom substrate. It is also contemplated that the plurality of sensing units may include one common first substrate while each individual sensing unit is also associated with its own second substrate. For example, the bottom substrate may be a common substrate while there are a plurality of top substrates; or there may be a plurality of bottom substrates and a common top substrate.

This disclosure provides a method and describes a device for measuring spatial distribution of shear stress over a surface simultaneously with the measurement of the normal pressure distribution. It may be used in the medical field for monitoring and measuring stress in human tissues in some non-limiting embodiments.

The disclosed device design relies on a normal pressure sensor array, but extends its capabilities to shear stress measurement by adding an additional mechanical element—a mechanical transducer. This transducer may be an array of rigid elements, or an elastic sheet with periodically varying elasticity, such that under shear it produces a distinguishable and interpretable variation of the normal pressure at its base—this pressure is measured by a pressure sensor array. The directly measured profile of the normal pressure at the base of the transducer is then used to reconstruct the normal and shear stress on the top surface. This approach effectively converts a scalar-force-measuring sensor array into vector-force-measuring sensor array, without directly modifying the measuring element, but via spatial conversion of the stress in a predictable manner.

The systems and methods of the disclosure allow simultaneous measurement of the spatial profile of shear stress and normal pressure primarily in, but not restricted to, human tissues. Studies show that both normal and shear forces play a role in the in the development of tissue disruption and ultimately ulceration, but the exact role of the shear stress is poorly understood. While normal pressure mapping devices are abundant, adequate surface shear measurement devices are not available. Providing a reliable tool for shear stress measurement over a tissue surface area would help facilitate understanding the mechanisms of shear induced damage in tissues, detecting movement habits associated with harmful stress, and stopping tissue damage at early stages, when it is most effective.

One non-limiting advantage of some embodiments of the device is its simple construction, and as a result potentially higher spatial resolution of the measurement. Alternative devices require a complicated 3-dimensional structure of both electronic and mechanical components. The disclosed device may rely on a 2-dimensional electronic component (in plane pressure sensor array), while the 3d-structured component, the shear-to-pressure transducer, is purely mechanical. This simplifies device production and increases its compactness.

In some embodiments, the device may be used in walking pads, mats, platforms, and/or shoe insoles.

The limitations to the device will be dictated by the ability to produce a dense enough in-plane array of normal pressure sensors. The device will already be practically useful with 16 sensors per $cm^2$, which does not pose a challenge for modern electronics manufacturing techniques. The number of sensors and/or sensing units per $cm^2$ may be in the range of 1-50, including 5-30, and 10-20.

Shear measurement capability provided by this device may be a natural extension to every plantar pressure measuring device—either step-on platform/plate or in-shoe insert, for both medical and athletic applications.

The device may include an array of pressure and shear stress sensors. The functional components include an array of sensors that measure normal pressure/force and a shear-to-normal stress "mechanical transducer". The pressure sensors are positioned on a surface of a rigid or flexible support substrate. The "mechanical transducer" may be placed in contact with the support substrate; the other surface of the transducer may serve as a sensory surface for pressure and/or shear application. Normal distribution may be measured at the support surface with the normal force sensors, and then interpreted to reconstruct the pressure and shear distribution at the sensory surface. The use of the "mechanical transducer" in conjunction with the normal pressure sensor array allows for shear stress measurement together with the normal stress. Non-limiting examples of designs of the "mechanical transducer" and techniques for interpreting the normal pressure distribution into the actual shear and pressure profile at the loaded sensory surface are also disclosed.

The "mechanical transducer" may include an array of harder inclusions in a softer sheet (matrix). In some embodiments, the matrix can be omitted and hard inclusions may be separated by air. The inclusions need not necessarily be rigid either, but are generally harder than the surrounding media so that shear applied to the top surface produces a variation of normal pressure on the bottom surface.

A non-limiting embodiment of the device includes an array of individual shear/normal force sensing units. Each sensing unit includes a plurality of normal force sensors (e.g., four normal force sensors placed on a flat base in a square pattern) and a mechanical transducer (e.g., a hard cube placed on top of the sensors, so that each quadrant of the cube base covers one of the sensors). The load force, eventually from a walking foot, will be applied to the top surface of the cube. The stress will be transferred to the base of the cube, and the normal component of the forces will be measured directly by each of the four sensors. The measured values will then be converted to obtain the magnitude and direction of the force applied to the top surface of the cube.

Figure 3:
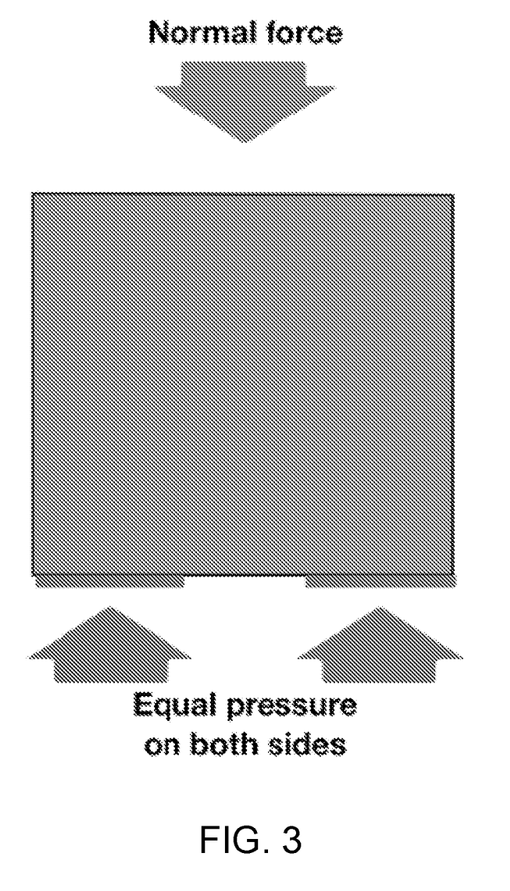
FIG. 3 is an illustration of the normal forces at the base of the cube under the application of a normal force to the top of the cube.
Figure 4:
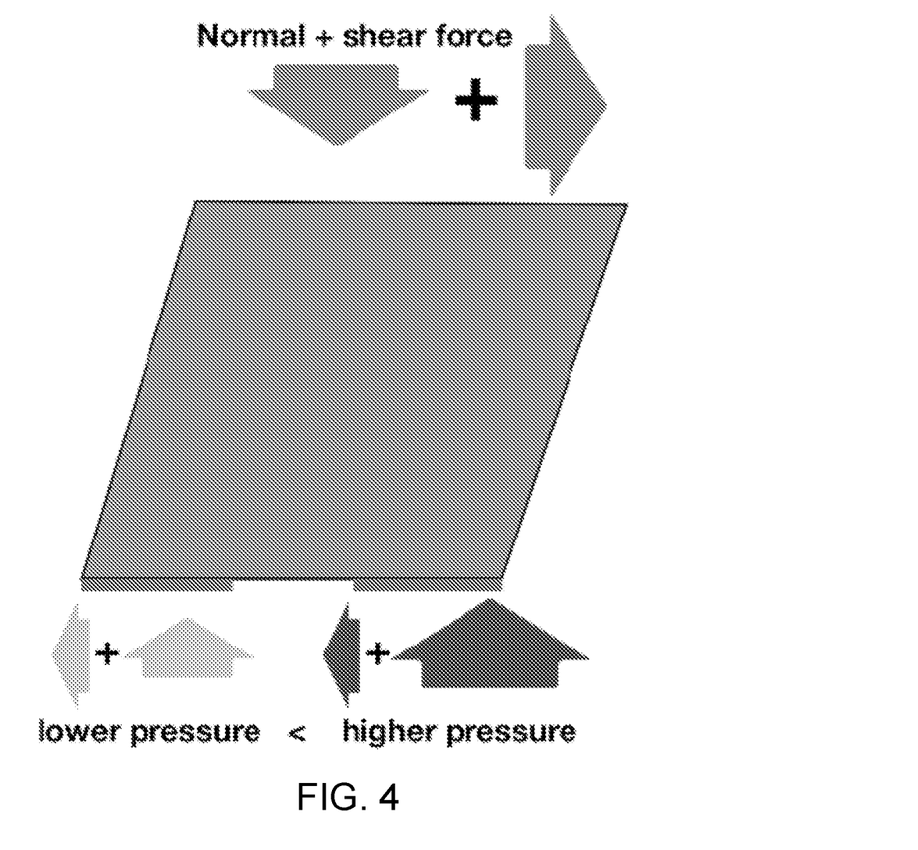
FIG. 4 is an illustration of the normal forces at the base of the cube under the application of a normal force and a shear force to the top of the cube.

The cube serves as a mechanical transducer and converts shear stress into interpretable variation of the in-plane pressure. Qualitative explanation of the mechanism is as follows. The top face of the cube (opposite to the base in contact with force sensors) is subject to normal and shear load, i.e., it is the walking surface. When a uniform normal force is applied to the top face of the cube, it will be distributed equally between four sensors at the base (FIG. 3). If an additional tangential (shear) force is applied, pressure at the base will be higher on the side of the shear direction (FIG. 4). The asymmetry of the pressure below the cube is proportional the magnitude of the shear and average pressure across the four sensors is the normal pressure applied to the top of the cube.

The mechanical transducer is not restricted to a cubic shape, but can be a cylinder, pyramid, cone, sphere, or any other shape, as long as when sheared, the center of the normal pressure at the bottom of the transducer shifts with the shear. It is also not required that exactly four pressure sensors are placed beneath the transducer, but as many sensors can be placed as needed to detect and measure the change of the total force, and the displacement of the center of pressure below the transducer. As a first order approximation, the normal force applied to the top of the transducer is proportional to the measured total force below the transducer; shear direction is the direction of the displacement of the center of normal pressure, and magnitude of the shear force is proportional to the product of the total force below the transducer and the displacement of the center of normal pressure. The coefficients of proportionality can be defined via calibration. If the resolution of the pressure measurement below the transducer allows calculating higher moments of the pressure profile, then the force and shear at the top of the transducer may be approximated as a combination of those moments, also via calibration.

The array of the mechanical transducers may be also combined into a sheet with continuously varying elasticity (repeatedly), as long as shear produces similar effect on the pressure at the bottom surface as described above.

The device for the measurement of plantar shear forces may include an array of individual shear/normal force sensing units, and will allow mapping of the in-plane distribution of the stress. Each sensing unit may include four normal force sensors placed on a flat base in a square pattern, and a rubber transducer placed on top of the sensors, so that each quadrant of the transducer base covers one of the sensors. The load force, e.g., from a walking foot, will be applied to the top surface of the cube. The stress will be transferred to the base of the cube, and the normal component of the forces will be measured directly by each of the four sensors. The measured values can then be converted to obtain the magnitude and direction of the force applied to the top surface of the cube.

The normal force censors may include a pressure sensitive material. This material may have:

1. The ability to place the sensors densely enough on the supporting surface.
2. A dynamic range of measurement covering the typical loads during walking.
3. Precision of measurement high enough to capture the variation of the pressure induced by the shear only.

In some embodiments, the pressure sensors are electrical pressure sensors. The sensors may include a resistive film, which changes its electrical conductivity under applied pressure.

In some embodiments, one non-limiting aspect behind the design of the shear measurement device is to reduce the complexity of the actual pressure measuring component by confining all the pressure sensing elements into one plane, and to add a mechanical transducer (e.g., rubber cube) to convert shear stress into and interpretable variation of the in-plane pressure. A qualitative explanation of the mechanism is as follows. The top face of the transducer (opposite to the base in contact with force sensors) is subject to normal and shear load, i.e., it is the walking surface. When a uniform normal force is applied to the top face of the cube, it will be distributed equally between the four sensors at the base (FIG. 3). If an additional tangential (shear) force is applied, pressure at the base will be higher on the side of the shear direction (FIG. 4). The asymmetry of the pressure below the cube is proportional the magnitude of the shear and average pressure across the four sensors is the normal pressure applied to the top of the cube. In equilibrium, balance of forces and torques requires that for non-zero shear force, normal components of the force at the bottom of the cube are different. This statement is true even when deformation of the cube under shear is negligible.

The relationship between the forces in a simplified 2-dimensional model is now derived. Consider a square of size w×w supported by two pressure sensors of size w/2 each, with their centers positioned at a distance w/4 from the middle of the square lower edge. Assume that an external force is applied to the top edge of the square, and the square is kept in balance by the reaction from the pressure sensors. Assume for simplicity that all the forces are applied uniformly across the line of contact, and thus approximate them as applied to a point in the center of the top edge of the square and at the mid points of the sensors.

The force balance requires that $$F_n = F_{1n} + F_{2n}$$

$$F_t = F_{1t} + F_{2t}$$

The torque balance requires that $$(F_t + F_{1n} + F_{2n})\frac{w}{2} = (F_{2n} - F_{1n})\frac{w}{4}$$

The components of the force applied to the top edge can be expressed as:

$$F_n = F_{1n} + F_{2n} \quad \text{(Eq. 1)}$$

$$F_t = (F_{2n} - F_{1n})/4 \quad \text{(Eq. 2)}$$

or, inversely, $$F_{1n} = F_n/2 - 2F_t \quad \text{(Eq. 3)}$$

$$F_{2n} = F_n/2 + 2F_t \quad \text{(Eq. 4)}$$

The derived relationship is a first order approximation and for precise measurement one would need to include higher order corrections, and calculate the coefficients for the correction terms via calibration. Similar derivation can be carried out for 3-dimensional case as well, which is left for later. For now, the solution for this simple 2-dimensional model, despite being approximate, is useful to estimate the required dynamic range and sensitivity of the pressure sensors, which can be done after estimation of the typical values of the stress in the foot during walking.

Figure 5:
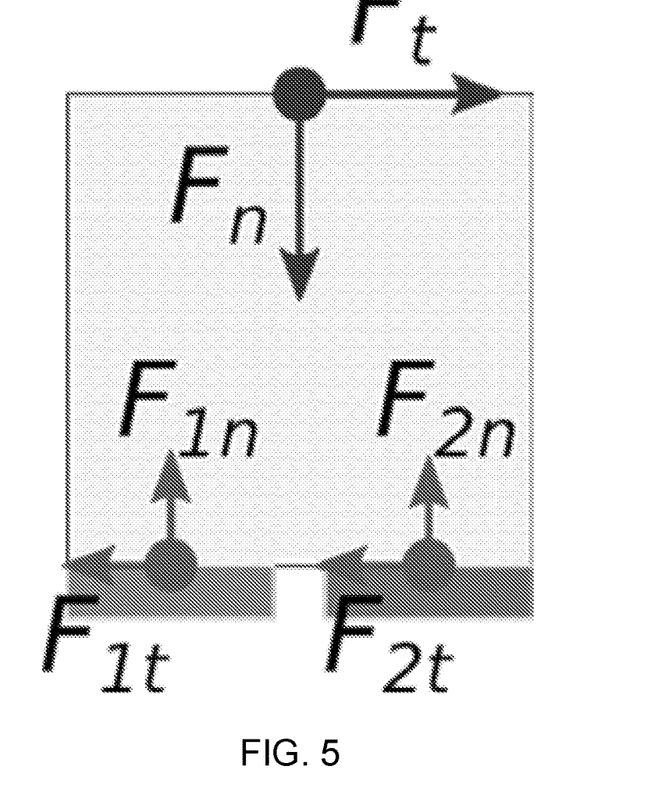
FIG. 5 is a 2-dimensional cross-section of the shear-to-pressure transducer.

Both $F_n$ and $F_t$ produce contribution of the same order of magnitude to $F_1$, $F_2$, thus the resolution of the measurement that is sufficient for resolving changes of the normal pressure within the desired range, will be sufficient to detect the changes due to shear of a comparable magnitude. FIG. 5 illustrates a cross-section of a portion of an apparatus and the applied forces.

Typical values of normal pressure and shear stress exerted by the foot during walking are estimated.

The typical normal force is calculated as $$F_n = m(g + a_v),$$

where g=9.8 m/s$^2$, and av is a typical peak value of vertical acceleration of the center of mass of the body during walking.

The shear force from horizontal acceleration is estimated as:

$$F_s = ma_h,$$

where ah is the typical peak value of horizontal acceleration of the center of mass of the body during walking.

For both horizontal and vertical acceleration, the same approximate upper limit of 0.5 g is used. Thus, peak normal force is $F_n \approx 1.5$ mg and peak shear force $F_s \approx 0.5$ mg.

Time of the peak acceleration for the area of contact of the foot with the ground is approximately 50 cm$^2$, which is an intermediate value between the area of contact of the heel (35 cm$^2$) and the area or contact of the forefoot (60 cm$^2$), which were estimated from a footprint of a size 10 foot. To avoid underestimating the peak forces, a mass of m=100 kg was used in the calculations.

Substituting the number gives values of peak normal pressure as $P_{n,peak} \approx 3 \cdot 10^5$ Pa, and peak shear stress $P_{s,peak} \approx 10^5$ Pa.

If we estimate the full contact area of the foot as 100 cm$^2$, then, when standing still on both feet, normal pressure is $P_{n,still} \approx 5 \cdot 10^4$ Pa, and shear stress is zero.

To estimate the dynamic range for the pressure sensors, the range of the expected plantar stress from $10^4$ Pa to $10^6$ Pa for both normal and shear components is estimated. Referring to Equations (1-4), the dynamic range for the sensors is also estimated as $10^4$ to $10^6$ Pa. Contributions from normal and shear stress of the same magnitude to the changes of the measured normal pressure are also of the same order of magnitude, thus it is expected that the measurement precision sufficient to detect the normal pressure changes within the desired dynamic range will be also sufficient to measure the contributions from the shearing loads.

Footprint of a size 10 foot. Rough estimation for the heel contact area gives 35 cm$^2$, and 60 cm$^2$ for the forefoot; total area of contact is estimated roughly as 100 cm$^2$.

A non-limiting sensor includes a pressure sensitive film (PSF) and two electrodes placed either on the opposite sides of the film, or on the same side. PSF is often a polymer matrix with inclusions of conductive material such as carbon or metallic particles. Non-limiting examples of PSFs include:

| Host/Guest | Name/Manufacturer | Thickness (mm) | Hardness |
|---|---|---|---|
| Plastic/carbon | Velostat #1361 (Lingqstat) | 0.1 | N/A |
| Plastic/carbon | Adafruit Industries | 0.5 | N/A |
| Polyolefin/carbon | SCS (3M) | 0.1 | N/A |
| Polyolefin/carbon | SCS (3M) | 0.15 | N/A |
| Rubber/conductive particles | Zoflex | 1 | Shore A hardness 45 |
| Rubber/conductive particles | Zoflex | 1.5 | Shore A hardness 45 |
| Rubber/conductive particles | Zoflex | 1 | Shore A hardness 60 |
| Rubber/conductive particles | Zoflex | 1.5 | Shore A hardness 60 |

A range of conductive films was selected as candidates for use as the electrodes in the pressure sensor:

| Material | Thickness (mm) |
|---|---|
| Aluminum | 0.02 |
| Aluminum | 0.04 |
| Copper | 0.02 |
| Copper | 0.04 |
| Copper | 0.06 |

A copper film with a thickness of 0.02 mm may be selected for its flexibility and ease of soldering.

Two non-limiting embodiments of commercially available sensors include:

| Host/guest | Company | Active area - diameter (mm) |
|---|---|---|
| Polymer thick film/conductive particles | Interlink Electronics | 5.62 |
| Polyester, polyimide/pressure sensitive ink | Tekscan | 9.53 |

Conductivity of pressure sensitive films increases with applied pressure. The saturation of conductivity occurs at certain pressure threshold. The desired pressure range for the envisioned device is $10^4$ Pa to $10^6$ Pa. Measuring conductivity versus pressure characterizes the dynamic range of testing films. Based on the measured dynamic range of each film, films without conductivity saturation within required pressure range can be selected as candidates.

Conductivity is defined by $$\sigma = \frac{1}{\rho} = \frac{l}{RA}$$

where, ρ is resistivity,
R is the resistance,
l is the length of the film, and
A is the cross-section of the film.

Figure 6:
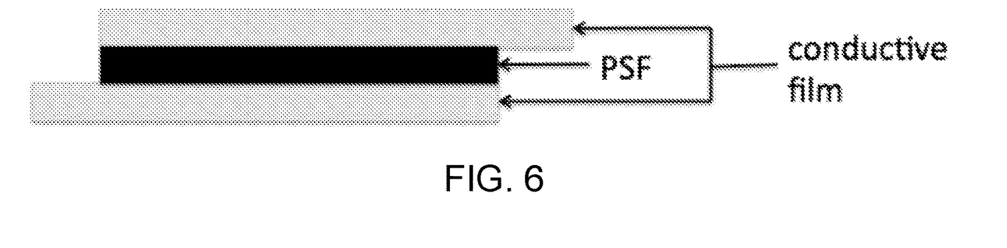
FIG. 6 illustrates a pressure sensitive resistor ($R_{PSF}$) including a pressure sensitive film (PSF) (e.g., with an area of 4 mm×4 mm) and two conductive films.
Figure 7:
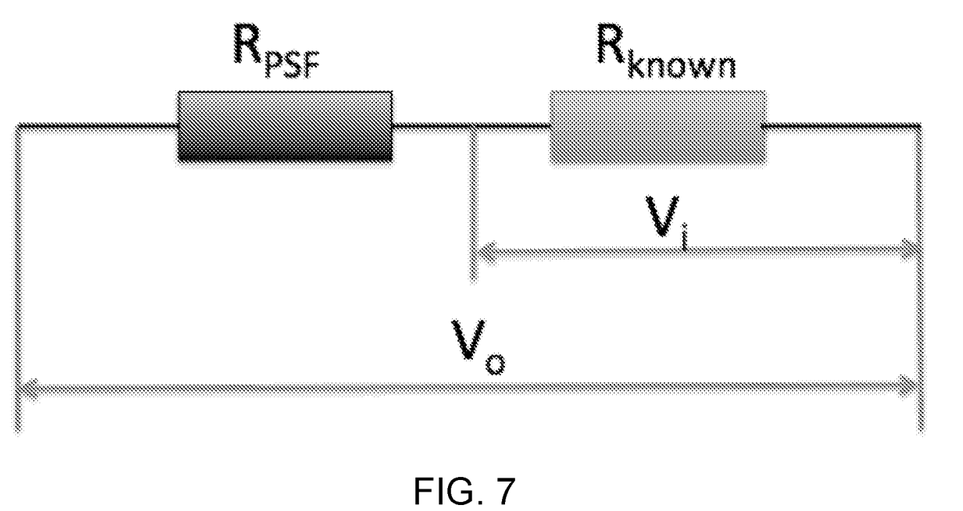
FIG. 7 illustrates how the resistance of $R_{PSF}$ can be obtained using a voltage divider.

The film is sandwiched by two pieces of a conductive film as shown in FIG. 6. Using a voltage divider (FIG. 7), the resistance of the film can be obtained using LabView and National Instrument data acquisition device DAQ-6211.

$$R_{PSF} = \frac{V_o - V_i}{V_i} R_{known}$$

where $R_{known}$ is the resistor with known resistance in the voltage divider;
Vo is the voltage across both resistors, provided by analog voltage output of DAQ-6211; and
$V_i$ is the voltage across the known resistor, read by analog input of DAQ-6211.

Dimensions of the film can be measured with a ruler and a micrometer. Thus, conductivity of the film can be obtained.

The observation of narrow dynamic range in some samples raises the question of ways to overcome this restriction and extend the dynamic range. Possible strategies are listed below:

Alter the construction of the mechanical shear-to-pressure transducer (i.e. the rubber cube), by adding a rigid vertical core to its center region. Such alteration could direct a significant part of the normal load into the area between the pressure sensors, letting the sensors measure smaller residual forces. This modification would relax the requirements for the pressure sensor dynamic range.

In the pressure sensor, replace a single PSF with a stack of a plurality (e.g., 2, 3, 4, 5, or more) of different PSFs. Keep PSFs sandwiched between the electrodes. This strategy was tested by measuring the pressure-conductivity curve for a stack of Zoflex 1.5 mm (hardness 45) and Velostat/Linqstat 0.1 mm. The results demonstrated a significant extension of the dynamic range compared to the single-layered construction.

Alternatively to a sandwich type construction of the sensor, when the PSF is placed between the electrodes, one may place both electrodes in one plane. This may be achieved, for instance, in a form of an interdigitated array, where the PSF is placed on top of the electrodes. In this configuration, the direction of the electric current will be perpendicular to the direction of applied force, and one may expect that saturation of the in-plane conductive paths would require higher pressure. A preliminary test has been performed with the Velostat sample, demonstrating the increase of the saturation pressure to more than 1 MPa.

The following examples are provided to illustrate the devices and methods of the present disclosure. The examples are merely illustrative and are not intended to limit the disclosure to the materials, conditions, or process parameters set forth therein.

Examples

A mechanical load apparatus was designed and built to apply variable loads to the pressure sensitive films. The load data was collected from readings on a balance with resolution of 0.1 g. The measured force and resistance were combined to construct pressure-conductivity curves for the evaluated PSFs.

Degradation and serious deformation of the films may occur under loads in desired pressure range of the envisioned device. The density of conductive particles embedded within the polymer matrix may change over time. Thus, measurement repeatability and lifetime of the tested films were characterized.

Initially, the conductivity of the sample was measured as function of load. Then, an electrical linear actuating system, modified for this purpose, was used to apply repetitive pressure on the films. The resistance of each film was measured and data was collected using LabView and DAQ-6211 during the process. This was followed by dynamic range measurements. This way, changes in the dependence of the conductivity on pressure due to repeated loading could be determined.

It is estimated that a subject walks 100 times with the envisioned device a day to diagnose shear distribution of the foot and each foot will exert pressure on one device for 50 times. The device can be recalibrated with three month of daily usage. So the films were tested with 5000 times repetitive pressure at peak of 100 kPa.

The dynamic range of the PSFs was measured according to the procedure described above before and after the stress-test (repeated loading/unloading of the sensor).

Stress testing PSFs and evaluating them for measurement repeatability leads to the following conclusions:

Most PSF samples exhibit responsiveness at lower pressures, reaching saturation below the desired level of $10^6$ Pa.

Noticeable degradation is observed in most samples subject to stress testing, undermining long-term repeatability of the measurements.

Two promising samples were identified, with satisfactory dynamic range and resilience to repeated application of mechanical load—3M SCS 0.1 mm and Adafruit Industries 0.26 mm PSF.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. An apparatus for measuring a surface profile of shear stress comprising:
   a substrate; and
   a plurality of sensing units on the substrate, each sensing unit comprising:
      a mechanical transducer having a receiving surface and a sensing surface; and
      a plurality of normal force sensors between the sensing surface and the substrate;
      wherein the mechanical transducer comprises rubber.

2. The apparatus of claim 1, wherein the mechanical transducer is a rectangular prism.

3. The apparatus of claim 2, wherein the sensing surface is square-shaped; wherein the plurality of normal force sensors consists of four normal force sensors; and wherein each normal force sensor associated with a different quadrant of the sensing surface.

4. The apparatus of claim 1, wherein the mechanical transducer comprises a plurality of rigid inclusions dispersed in the rubber.

5. The apparatus of claim 1, wherein each normal force sensor comprises a pressure sensitive film, a first electrode, and a second electrode.

6. The apparatus of claim 5, wherein the two electrodes are on opposite sides of the pressure sensitive film.

7. The apparatus of claim 5, wherein the two electrodes are on the same side of the pressure sensitive film.

8. The apparatus of claim 5, wherein the pressure sensitive film comprises conductive particles dispersed in a polymer matrix.

9. The apparatus of claim 8, wherein the conductive particles comprise carbon particles.

10. The apparatus of claim 8, wherein the conductive particles comprise metallic particles.

11. The apparatus of claim 5, wherein the pressure sensitive film has a thickness in the range of about 0.1 mm to about 1.5 mm.

12. The apparatus of claim 5, wherein the first electrode and the second electrode comprise aluminum or copper.

13. The apparatus of claim 5, wherein the first electrode and the second electrode have thicknesses in the range of about 0.02 mm to about 0.06 mm.

14. The apparatus of claim 5, wherein each normal force sensor further comprises a second pressure sensitive film.

15. The apparatus of claim 1, wherein the mechanical transducer comprises a rigid, vertically-oriented core in a central region of the rubber.

16. An apparatus for measuring a surface profile of shear stress comprising:
a substrate; and
a sensing unit comprising:
a mechanical transducer having a receiving surface and a sensing surface; and
a plurality of normal force sensors between the sensing surface and the substrate;
wherein the mechanical transducer comprises rubber.

17. The apparatus of claim 16, wherein the mechanical transducer comprises a plurality of rigid inclusions in a flexible matrix.

18. The apparatus of claim 16, wherein the normal force sensor comprises a pressure sensitive film, a first electrode, and a second electrode.

19. The apparatus of claim 16, wherein each normal force sensor has a dynamic range of $10^4$ Pa to $10^6$ Pa.

20. A step-on platform or an in-shoe insert comprising the apparatus of claim 16.

* * * * *